United States Patent
Min et al.

(10) Patent No.: US 9,686,071 B2
(45) Date of Patent: Jun. 20, 2017

(54) OPPORTUNISTIC FULL-DUPLEX COMMUNICATIONS

(71) Applicant: INTEL CORPORATION, Santa Clara, CA (US)

(72) Inventors: Alexander W. Min, Portland, OR (US); Minyoung Park, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 85 days.

(21) Appl. No.: 14/747,096

(22) Filed: Jun. 23, 2015

(65) Prior Publication Data

US 2016/0380746 A1    Dec. 29, 2016

(51) Int. Cl.
   *H04B 7/00*     (2006.01)
   *H04L 5/16*     (2006.01)
   *H04L 12/26*    (2006.01)
   *H04W 84/12*    (2009.01)

(52) U.S. Cl.
   CPC ............ *H04L 5/16* (2013.01); *H04L 43/0888* (2013.01); *H04W 84/12* (2013.01)

(58) Field of Classification Search
   None
   See application file for complete search history.

(56) References Cited

U.S. PATENT DOCUMENTS

| | | | | |
|---|---|---|---|---|
| 2012/0275383 | A1* | 11/2012 | Matsukawa | H04W 72/10 370/328 |
| 2013/0223294 | A1* | 8/2013 | Karjalainen | H04L 5/14 370/277 |
| 2015/0078215 | A1* | 3/2015 | Zhou | H04L 5/003 370/277 |
| 2015/0131517 | A1* | 5/2015 | Chu | H04W 72/005 370/312 |

OTHER PUBLICATIONS

U.S. Appl. No. 14/969,322, filed Dec. 15, 2015, Min et al.
U.S. Appl. No. 14/977,373, filed Dec. 21, 2015, Min et al.
Goyal, Sanjay et al. "A Distributed MAC Protocol for Full Duplex Radio" IEEE, Signals, Systems and Computers 2013 Asilomar Conference, Nov. 3-6, 2013, pp. 788-792.
IEEE Standards Association "Part II: Wireless LAN Medium Access Control (MAC) and Physical Payer (PHY) Specifications", IEEE Std 802.11—2012; Mar. 29, 2012.

* cited by examiner

Primary Examiner — Steven H Nguyen
Assistant Examiner — Rebecca Song
(74) Attorney, Agent, or Firm — Jason H. Vick; Sheridan Ross, PC

(57) ABSTRACT

Techniques for presenting communication between two or more stations in a WLAN environment are provided. Specifically, methods are presented, that when taken alone or together, provide a device or group of devices with an efficient way to adaptively switch between full duplex and half duplex communications. The present disclosure includes a method that provides increased system throughput through opportunistic full duplex transmission.

25 Claims, 6 Drawing Sheets

OPPORTUNISTIC FULL-DUPLEX COMMUNICATIONS

TECHNICAL FIELD

An exemplary embodiment pertains to wireless networks. Some embodiments relate to wireless networks that operate in accordance with one of the Institute of Electrical and Electronics Engineers (IEEE) 802.11 standards including the IEEE 802.11-2012 standards. Some embodiments relate to wireless devices communicating using Wireless Local Area Networks (WLANs). Exemplary embodiments also relate to the communication between the wireless devices using opportunistic full-duplex communications.

BACKGROUND

The exponential growth and use of electronic devices is rapidly depleting available spectrum. To compensate, industry, academia, and even standards bodies, such as IEEE 802.11 WLAN, have focused on developing new communication mechanisms to deal with the spectrum scarcity. One such technology recently introduced is full-duplex communications. Full-duplex communications is a new communication system mechanism that enables a wireless device to send and receive packets at the same time and on the same frequency band. Full-duplex communication can significantly improve spectrum efficiency by allowing wireless radios to simultaneously transmit and receive data using self-interference cancellation (SIC) technologies in analog RF circuitry and digital signal processing.

However, despite the implementation of full-duplex communications, issues exist that remain to be resolved. For example, the current full-duplex implementation requires a new MAC design which can involve additional overhead for operations including opportunity identification and link setup. In opportunity identification, overhead is incurred as the access point (AP) searches for a station (STA) for uplink transmission. In link setup, overhead is incurred as additional control data packet exchange may be necessary to share relevant information (e.g.,) and to establish the communication between the AP and the STAs. As another example, the full-duplex throughput may underperform half duplex throughput. This scenario is possible in instances where the actual data transmission duration is not significantly longer than the time spent for full-duplex opportunity detection and link setup. In yet another example, the system enabled for full-duplex communications is always on regardless of the actual performance benefit. Therefore, regardless of the system performance, the AP continues to search for a STA and link setup costs increase in packet transmission. Therefore, it is with these and other considerations that the present improvements have been developed.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DESCRIPTION OF EMBODIMENTS

Figure 1:
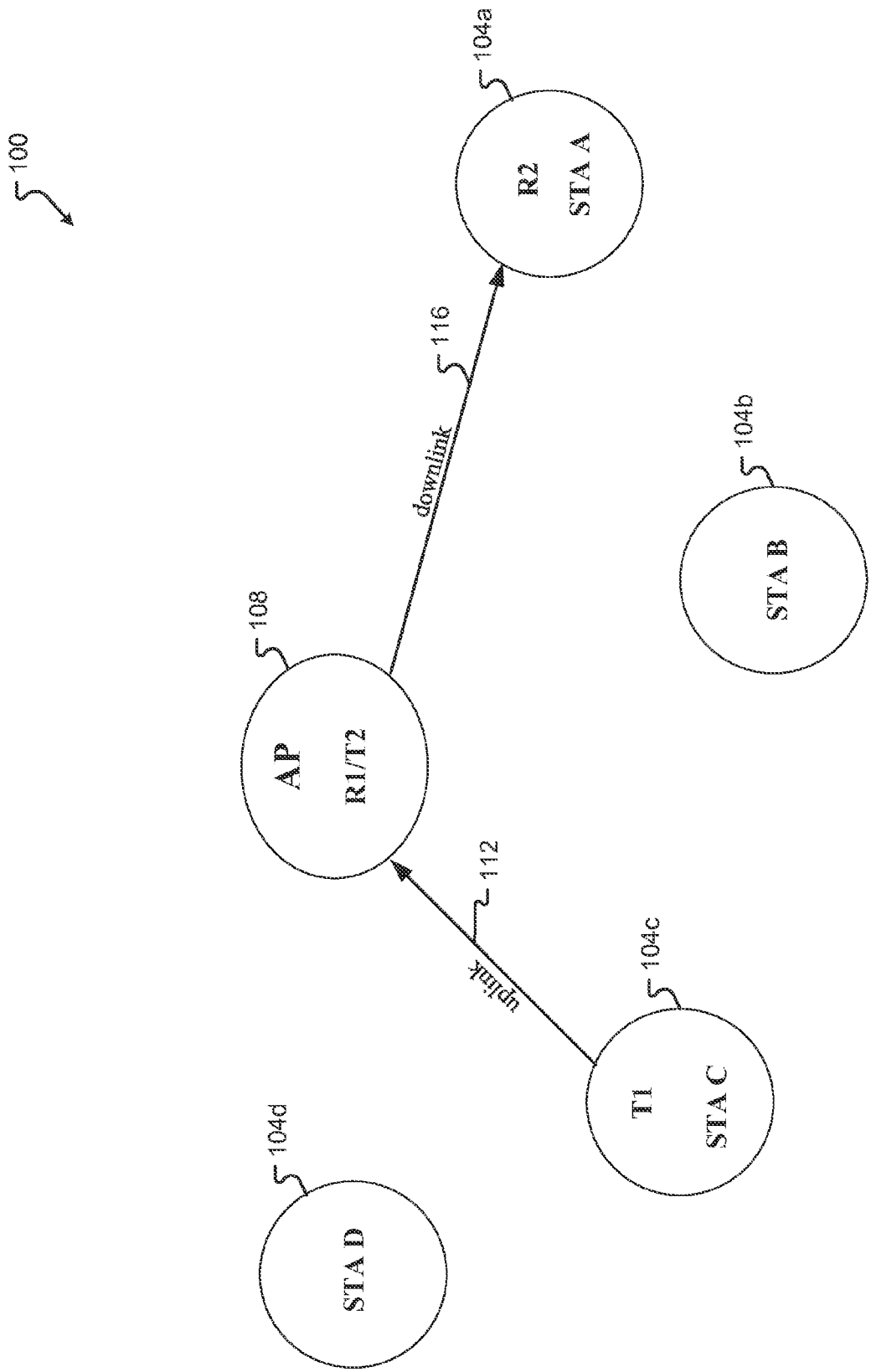
FIG. 1 illustrates an exemplary communication system using full-duplex communication.

The existing MAC protocol with full duplex capability has been designed to remain on regardless of the system requirements. As such, the MAC layer suffers from overhead in performing opportunity detection and link setup. Recently, a new set of MAC-layer protocols were proposed to facilitate the detection of full-duplex opportunities. However, opportunistic full-duplex communications have yet to be explored. One embodiment presents an opportunistic full-duplex mechanism that performs adaptive full-duplex and half-duplex transmission based on an expected system throughput. By introducing an adaptive mechanism, system performance can be increased as the node (i.e., AP) monitors performance trade-offs between the use of full-duplex and half-duplex operations.

The IEEE 802.11 standard specifies a common Medium Access Control (MAC) Layer which provides a variety of functions that support the operation of IEEE 802.11-based wireless LANs (WLANs). The MAC Layer manages and maintains communications between IEEE 802.11 stations (such as between radio network interface cards (NIC) in a PC or other wireless devices or stations (STA) and access points (APs)) by coordinating access to a shared radio channel and utilizing protocols that enhance communications over a wireless medium.

IEEE 802.11n introduced in 2009, improved maximum single-channel data rate from 54 Mbps of IEEE 802.11g to over 100 Mbps. IEEE 802.11n also introduced MIMO (multiple input/multiple output), where, according to the standard, up to 4 separate physical transmit and receive antennas carry independent data that is aggregated in a modulation/demodulation process in the transceiver.

The IEEE 802.11ac specification operates in the 5 GHz band and adds channel bandwidths of 80 MHz and 160 MHz with both contiguous and non-contiguous 160 MHz channels for flexible channel assignment. IEEE 802.11ac also adds higher order modulation and supports multiple concurrent downlink transmissions ("multi-user MIMO" (MU-MIMO)), which allows transmission to multiple spatial streams to multiple clients simultaneously. By using smart antenna technology, MU-MIMO enables more efficient spectrum use, higher system capacity and reduced latency by supporting up to four simultaneous user transmissions. IEEE 802.11 ac streamlines the existing transmit beamforming mechanisms which significantly improves coverage, reliability and data rate performance.

IEEE 802.11 ax is the successor to IEEE 802.11 ac and is proposed to increase the efficiency of WLAN networks, especially in high density areas like public hotspots and other dense traffic areas. IEEE 802.11ax will also use orthogonal frequency-division multiple access (OFDMA). Related to IEEE 802.11 ax, the High Efficiency WLAN Study Group (HEW SG) within the IEEE 802.11 working group is considering improvements to spectrum efficiency to enhance system throughput/area in high density scenarios of APs (Access Points) and/or STAs (Stations).

Embodiments may be implemented as part of Wi-Fi Alliance® Technical Committee Hotspot 2.0 Technical Task Group Hotspot 2.0 (Release 2) Technical Specification, Version 2.04, Jan. 2, 2013. However, the embodiments are not limited to IEEE 802.11 standards or Hotspot 2.0 standards. Embodiments can be used in implementation with other wireless communications standards, protocols, and the like.

In the following detailed description, numerous specific details are set forth in order to provide a thorough understanding of the disclosed techniques. However, it will be understood by those skilled in the art that the present embodiments may be practiced without these specific details. In other instances, well-known methods, procedures, components and circuits have not been described in detail so as not to obscure the present disclosure.

Although embodiments are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, a communication system or subsystem, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments are not limited in this regard, the terms "plurality" and "a plurality" as used herein may include, for example, "multiple" or "two or more". The terms "plurality" or "a plurality" may be used throughout the specification to describe two or more components, devices, elements, units, parameters, circuits, or the like.

Before undertaking the description of embodiments below, it may be advantageous to set forth definitions of certain words and phrases used throughout this document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, interconnected with, contain, be contained within, connect to or with, couple to or with, be communicable with, cooperate with, interleave, juxtapose, be proximate to, be bound to or with, have, or the like; and the term "controller" means any device, system or part thereof that controls at least one operation, such a device may be implemented in hardware, circuitry, firmware or software, or combination of at least two of the same. It should be noted that the functionality associated with any particular controller may be centralized or distributed, whether locally or remotely. Definitions for certain words and phrases are provided throughout this document and those of ordinary skill in the art should understand that in many, if not most instances, such definitions apply to prior, as well as future uses of such defined words and phrases.

The exemplary embodiments will be described in relation to communications systems, as well as protocols, techniques, means and methods for performing communications, such as in a wireless network, or in general in any communications network operating using any communications protocol(s). Examples of such are home or access networks, wireless home networks, wireless corporate networks, cellular networks, wireless local area networks and the like. It should be appreciated however that in general, the systems, methods and techniques disclosed herein will work equally well for other types of communications environments, networks and/or protocols.

For purposes of explanation, numerous details are set forth in order to provide a thorough understanding of the present techniques. It should be appreciated however that the present disclosure may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, and/or the Internet, or within a dedicated secured, unsecured, and/or encrypted system and/or within a network operation or management device that is located inside or outside the network. As an example, a wireless device can also be used to refer to any device, system or module that manages and/or configures or communicates with any one or more aspects of the network or communications environment and/or transceiver(s) and/or stations and/or access point(s) described herein.

Thus, it should be appreciated that the components of the system can be combined into one or more devices, or split between devices, such as a transceiver, an access point, a station, a network operation or management device, a node or collocated on a particular node of a distributed network, such as a communications network. As will be appreciated from the following description, and for reasons of computational efficiency, the components of the system can be arranged at any location within a distributed network without affecting the operation thereof.

Furthermore, it should be appreciated that the various links, including the communications channel(s) connecting the elements can be wired or wireless links or any combination thereof, or any other known or later developed element(s) capable of supplying and/or communicating data to and from the connected elements. The term module as used herein can refer to any known or later developed hardware, circuitry, software, firmware, or combination thereof, that is capable of performing the functionality associated with that element. The terms determine, calculate, and compute and variations thereof, as used herein are used interchangeable and include any type of methodology, process, technique, mathematical operational or protocol.

Moreover, while some of the exemplary embodiments described herein are directed toward a transmitter portion of a transceiver performing certain functions, this disclosure is intended to include corresponding and complementary receiver-side functionality in both the same transceiver and/or another transceiver(s), and vice versa.

Presented herein are embodiments of systems, processes, methods, etc. The embodiments may relate to a communication device and/or communication system. The communication system can include a Wireless Local Area Network (WLAN) connection. The WLAN connection can include communication and association between two or more stations or wireless devices using full-duplex communications.

The overall design and functionality of the system described herein is, as one example, a means for providing a more efficient MAC while increasing system throughput by using opportunistic full-duplex communications. In one embodiment, a novel networking mechanism/technique is introduced that enables adaptive switching between half-duplex and full-duplex transmission. The technique can generally reduce the time required for a wireless device to perform opportunity location of neighboring stations by computing and comparing expected system throughput. As a result, higher system performance is achieved and MAC level overhead is reduced by switching between half-duplex and full-duplex signal transmission in a communication environment. Other advantages exist as well as will be discussed herein.

A communication environment 100 may include communication between various devices and/or stations as shown in FIG. 1. The communication environment 100 can contain multiple communication points/station(s) (STA) 104a, 104b, 104c, and 104d. The STAs 104a-104d can be any one of a laptop computer, smartphone, wireless device, notebook, subnotebook, a tablet or other electronic computing device or communications device or videogame device, or entertainment device, or the like. The communication environment 100 can also include one or more Access Points 108. The AP 108 can communicate via a communication channel using uplink and/or downlink transmission with any one or more of STAs 104a-104d. The communication can be at least one of half-duplex or full-duplex communication.

Full duplex (FD) communications is a communication technology that enables a wireless devices (e.g., STA 104, AP 108, etc.) to send and receive packets at the same time and on the same frequency band. Full-duplex communications has been proposed to mitigate the spectrum scarcity problem caused by the exponentially increasing mobile data traffic, services, and applications. Further, full-duplex communications allows for simultaneously communicating with one or more STAs 104a-104d in an uplink and downlink transmission while using self-interference cancellation caused by downlink traffic so that the uplink packets can be successfully decoded.

As an example, in FIG. 1, STA C 104c can communicate with AP 108 in an uplink transmission 112, where STA C 104c is transmitting information T1 and the AP 108 is receiving the information R1. Simultaneously, the AP 108 can also communicate with a secondary station, STA A 104a. In this transmission, the AP 108 is transmitting information T2 while STA A 104a is receiving the information R2 in a downlink transmission 116. Alternatively, the communication between AP 108 and STA A 104a and the communication between the AP 108 and STA C 104c can occur at a different instance and/or frequency band and/or using half-duplex communications. In another example, uplink/downlink transmission can occur between STA D 104d and AP 108. Yet in another example, the communication between AP 108 and STA B 104b can occur. Still yet in another example, a full-duplex communication can occur between the AP 108 and one of the STAs 104a-104d. Similarly, full and/or half duplex communication can occur between the AP 108 and any one or more of the STAs 104a-104d. Further, the communication configurations can extend beyond what has been presently described to include communication between AP/STA, STA/AP, STA/STA, AP/AP, and other wired and/or wireless devices.

Figure 2:
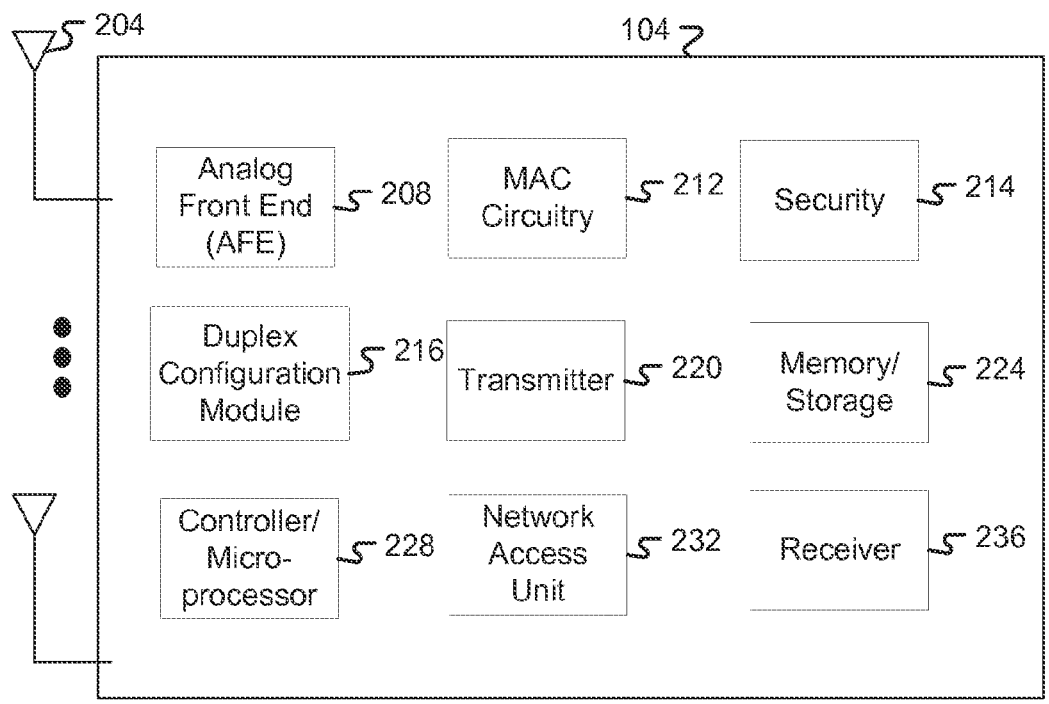
FIG. 2 illustrates an exemplary station (STA)

An example of a station (STA) 104 architecture is shown in FIG. 2. The STA 104 may comprise hardware circuitry and/or software that conduct various operations. The STA 104 also includes conventional and well known components which have been omitted for clarity. The operations can include, but are not limited to, conducting calls, synchronizing with other APs 108, opening multiple applications, presenting information through audio and/or video means, communicating via a WLAN, etc. The STA 104 can be any type of computing system operable to conduct the operations described here. As an example, the STA 104 can be a mobile phone which includes and interacts with various modules and components 208-236 as shown in FIG. 2.

The STA 104 can have one more antennas 204, for use in wireless communications such as multi-input multi-output (MIMO) communications, Bluetooth®, etc. The antennas 204 can include, but are not limited to, directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

Antennas 204 generally interact with an Analog Front End (AFE) module 208, which enables the correct processing of the received modulated signal and signal conditioning for a transmitted signal. The AFE 208 is functionally located between the antenna and a digital baseband system in order to convert the analog signal into a digital signal for processing.

The STA 104 can also include a controller/microprocessor 228 and a memory/storage 224. The STA 104 can interact with the memory/storage 224 which may store information and operations necessary for configuring and transmitting or receiving the message frames described herein. The memory/storage 224 may also be used in connection with the execution of application programming or instructions by the controller/microprocessor 228, and for temporary or long term storage of program instructions and/or data. As examples, the memory/storage 224 may comprise a computer-readable device, RAM, ROM, DRAM, SDRAM or other storage devices and media.

The controller/microprocessor 228 may comprise a general purpose programmable processor or controller for executing application programming or instructions related to the STA 104. Further, controller/microprocessor 228 can perform operations for configuring and transmitting message frames as described herein. The controller/microprocessor 228 may include multiple processor cores, and/or implement multiple virtual processors. Optionally, the controller/microprocessor 228 may include multiple physical processors. By way of example, the controller/microprocessor 228 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The STA 104 can further include a transmitter 220 and receiver 236 which can transmit and receive signals, respectively, to and from other STAs 104 or access points 108 using the one or more antennas 204. Included in the STA 104 circuitry is the medium access control or MAC Circuitry 212. MAC circuitry 212 provides the medium for controlling access to the wireless medium. In an exemplary embodiment, the MAC circuitry 212 may be arranged to contend for a wireless medium and configure frames or packets for communicating over the wireless medium.

The Duplex Configuration Module 216 can work with the MAC circuitry 212 and is a module that can be used in determining the radio configuration to use (i.e., full or half duplex) based on the information received from another STA 104 or AP 108. The Duplex Configuration Module 216 can work with or independently of the Memory/Storage 224 and Controller/Microprocessor 228 in determining the sub-channel allocation information transmitted by the Access Point 108. In addition, the Duplex Configuration Module 216 can also be used to determine if the STA 104 contains data for uplink transmission in order to respond to the request transmitted by the AP 108. The Duplex Configuration Module 216 can also work with other modules within the STA 104 to transmit the data in uplink transmission using the designated sub-channel and upon completion of the full-duplex transmission transmit and/or listen for an acknowledgment.

The STA 104 can also contain a security module 214. This security module 214 can contain information regarding, but not limited to, security parameters required to connect the STA 104 to AP 108 or other available networks, and can include WEP or WPA security access keys, network keys, etc. The WEP security access key is a security password used by Wi-Fi networks. Knowledge of this code will enable the STA 104 to exchange information with the access point 108. The information exchange can occur through encoded messages with the WEP access code often being chosen by the network administrator. WPA is an added security standard that is also used in conjunction with network connectivity with stronger encryption than WEP.

Another module that the STA 104 can include is the network access unit 232. The network access unit 232 can be used for connecting with the AP 108. In one exemplary embodiment, connectivity can include synchronization between devices. In another exemplary embodiment, the network access unit 232 can work as a medium which provides support for communication with other stations. In yet another embodiment, the network access unit 232 can work in conjunction with at least the MAC circuitry 212. The network access unit 232 can also work and interact with one or more of the modules described herein.

The modules described and others known in the art can be used with the STA 104 and can be configured to perform the operations described herein in conjunction with FIG. 1 and FIGS. 3-6.

Figure 3:
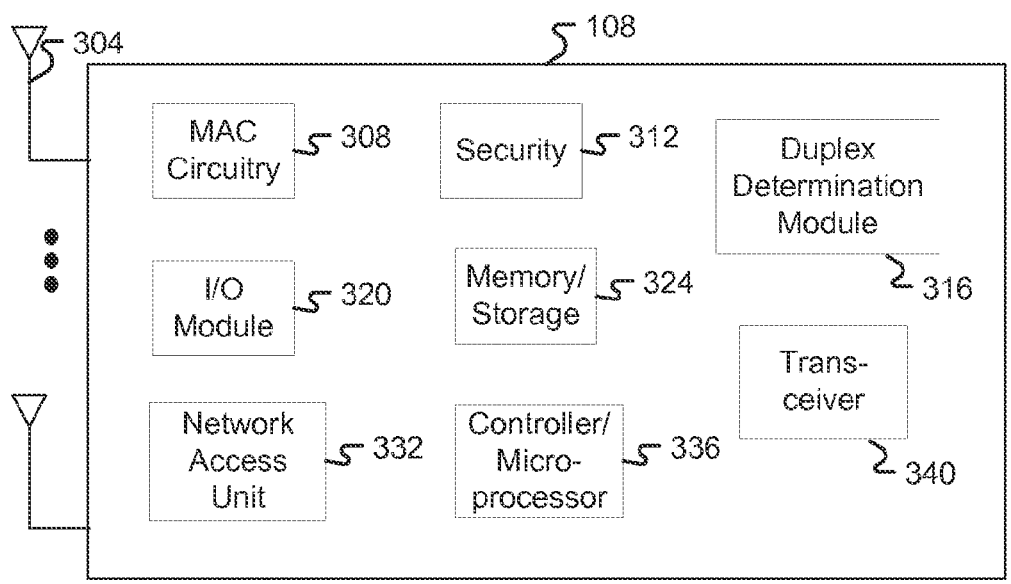
FIG. 3 illustrates an exemplary access point (AP)

An example of the Access Point 108 architecture is shown in FIG. 3. The AP 108 may comprise hardware and/or software that conduct various operations. The AP 108 can also include one or more of the elements as shown in FIG. 2 as well as conventional and well known components which have been omitted for clarity. The operations can include, but are not limited, communicating with STAs, acknowledging packet receipt, synchronizing with STAs 104, receiving and processing data frames, etc. The access point 108 can be any type of computing system operable to conduct the operations described here. As an example, the access point 108 can be a router which includes and interacts with various modules and components 308-340 as shown in FIG. 3.

The AP 108 can have one more antennas 304, for use in wireless communications such as multi-input single-output (MISO), single-input multi-output (SIMO), MIMO, or the like. The antennas 304 can include, but are not limited to, directional antennas, omnidirectional antennas, monopoles, patch antennas, loop antennas, microstrip antennas, dipoles, and any other suitable for communication transmission. In an exemplary embodiment, transmission using MIMO may require particular antenna spacing. In another exemplary embodiment, MIMO transmission can enable spatial diversity allowing for different channel characteristics at each of the antennas. In yet another embodiment, MIMO transmission can be used to distribute resources to multiple users.

The access point 108 can also include a controller/microprocessor 336 and a memory/storage 324. The access point 108 can interact with the memory/storage 324 which may store information and operations necessary for configuring and transmitting or receiving the message frames described herein. The memory/storage 324 may also be used in connection with the execution of application programming or instructions by the controller/microprocessor 336, and for temporary or long term storage of program instructions and/or data. As examples, the memory/storage 324 may comprise a computer-readable device, RAM, ROM, DRAM, SDRAM or other storage devices and media.

The controller/microprocessor 336 may comprise a general purpose programmable processor or controller for executing application programming or instructions related to the access point 108. Further, controller/microprocessor 336 can perform operations for configuring and transmitting beacons as described herein. The controller/microprocessor 336 may include multiple processor cores, and/or implement multiple virtual processors. Optionally, the controller/microprocessor 336 may include multiple physical processors. By way of example, the controller/microprocessor 336 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

An input/output (I/O) module 320 can also be part of the AP 108 architecture. The input/output module 320 and associated ports may be included to support communications over wired or wireless networks or links. For example, I/O module 320 can provide communication with wireless devices, STAs 104, servers, communication devices, and/or peripheral devices. Examples of an input/output module 320 include an Ethernet port, a Universal Serial Bus (USB) port, Institute of Electrical and Electronics Engineers (IEEE) port 1394, or other interface.

The access point 108 can further include a transceiver 340 which can transmit and receive signals to and from STAs 104 or APs 108 and/or the Internet using one or more antennas, 204 and 304 respectively, and/or hard-wired links (not shown). Included in the AP 108 architecture is the medium access control or MAC circuitry 308. MAC circuitry 308 provides the medium for controlling access to the wireless medium. In an exemplary embodiment, the MAC circuitry 308 may be arranged to contend for a wireless medium and configure frames or packets for communicating over the wireless medium. The MAC circuitry module 308 can work together or independently of a network access unit 332, which can aid in the communication between stations 104 and connecting to them. In one exemplary embodiment, the connectivity can include synchronization between devices. The network access unit 332 can also work and interact with one or more of the modules described herein.

The Duplex Determination Module 316 can also be part of the AP 108 architecture and can, but is not limited to, determining the transmission scheme to use in a full-duplex system. The Duplex Determination Module 316 can update the transmission scheme used by computing and comparing the expected system throughput and adapting the transmission scheme accordingly. The Duplex Determination Module can work with at least the MAC Circuitry 308, Memory/Storage 324 and Controller/Microprocessor 336 to perform uplink and downlink transmission, transmit discovery, trigger, and request frames, and to at least determine the scheme that will provide better system performance. The system performance can be increased by a decrease in MAC layer overhead and link setup. The system performance can be determined using a system of equations to solve for both the expected half-duplex throughput and the expected full-duplex throughput. Specifically, the Duplex Determination Module 316 can use at least a prediction module, a monitoring module, a radio configuration module and a throughput estimation module, which are further described below and in conjunction with FIG. 4.

AP 108 can also contain a security module 312. This security module 312 can contain information regarding, but not limited to, security parameters required to connect the STA 104 to AP 108 or other available networks, and can also include WEP or WPA security access keys, network keys, etc. The WEP security access key is a security password used by Wi-Fi networks. Knowledge of this code will provide the wireless device 104 with access to exchange information with the access point 108. The information exchange can occur through encoded messages and WEP access code is often chosen by the network administrator. WPA is an added security standard that is also used in conjunction with network connectivity with stronger encryption than WEP.

The modules described and others known in the art can be used with the access point 108 and can be configured to perform the operations described herein and in conjunction with FIGS. 1-2 and FIGS. 4-6.

Figure 4:
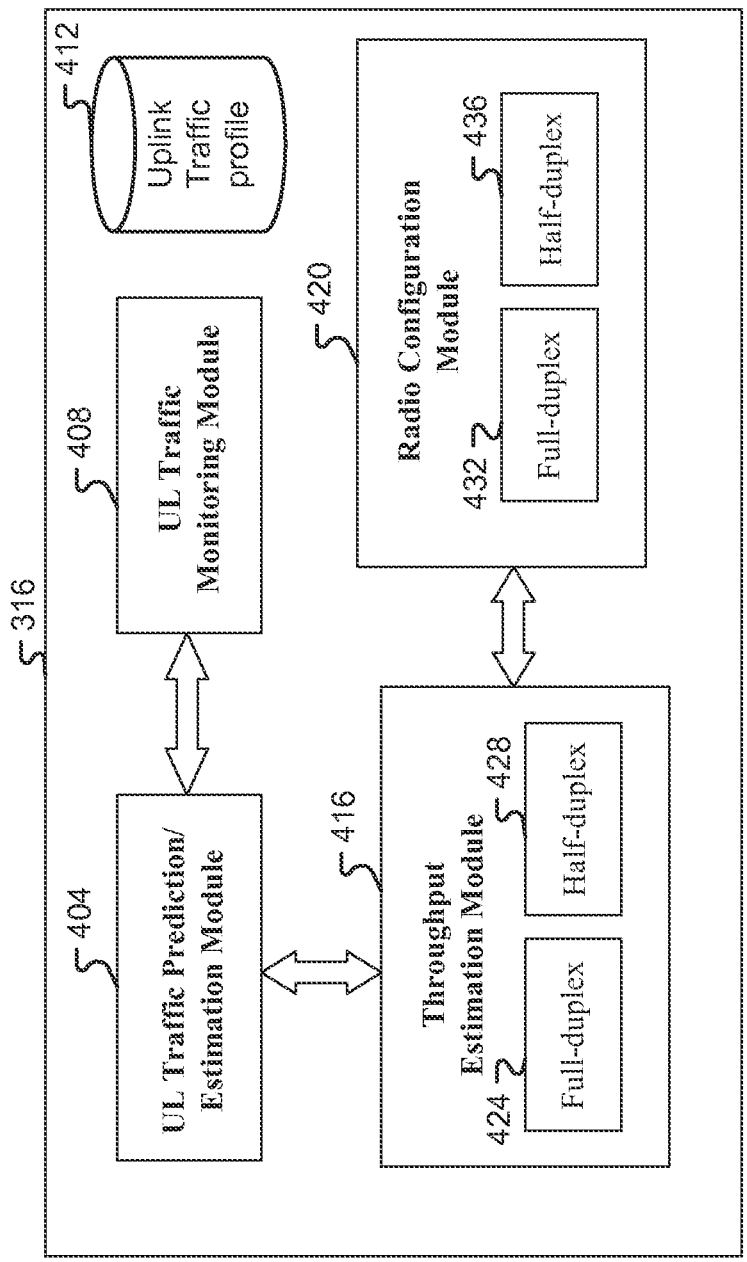
FIG. 4 illustrates an exemplary Duplex Determination Module.

FIG. 4 is an exemplary architecture for the Duplex Determination Module 316. As previously indicated, the Duplex Determination Module 316 is a module that can be used to determine the transmission scheme to use in an opportunistic full-duplex system. The Duplex Determination Module 316 can contain various components/sub-modules that aid the computation and comparison of system throughput in order to determine which of, full-duplex or half-duplex communication, provide better overall system performance. In general, the Duplex Determination Module can include at least an Uplink (UL) Traffic Prediction/Estimation Module 404, an UL Traffic Monitoring Module 408, a Throughput Estimation Module 416, a Radio Configuration Module 420, and even an Uplink Traffic Profile repository 412. The Uplink Traffic Monitoring Module 408 is a module that can continuously monitor and record the uplink activities occurring within the AP 108. The uplink activities can include any and all relevant information that can be used in determining system performance. For example, the relevant information can include, but is not limited to, message length, uplink transmission duration, uplink traffic frequency, etc. The relevant information can be stored in the Memory/Storage 324 and/or in a database such as the Uplink Traffic Profile repository 412.

The UL Traffic Monitoring Module 408 can work in conjunction with the UL Traffic Prediction/Estimation Module 404 to calculate the expected full-duplex throughput. Equation (2) below and FIG. 5B provide further details regarding the computation of the expected full-duplex throughput. In some instances, the UL Traffic Monitoring Module 408 can also work in conjunction with the UL Traffic Prediction/Estimation Module 404 to provide a priori knowledge of the uplink traffic statistics including uplink message length and duration. Using the uplink traffic statistics, the uplink message length can be estimated. As commonly known in the art, various mathematical and statistical methods exist in computing estimations. For example, the AP 108 can continuously monitor uplink traffic to create a repository of uplink traffic statistics, which can be stored in the Uplink Traffic Profile 412. Then, using a learning algorithm and statistics (i.e., frequency, message size, duration, other histories, etc.) stored, estimate the uplink message length. The learning algorithm used can be a weighted moving average algorithm. Alternatively, the learning algorithm can be an online learning algorithm, a weighted majority algorithm, and expectation maximization algorithm, and any other algorithms that may be used for message estimation including non-learning algorithms as commonly known in the art.

In addition, the Uplink Traffic Prediction/Estimation Module 404 can be used to predict the presence of the uplink traffic as needed and can estimate the expected uplink message length. The Uplink Traffic Prediction/Estimation Module 404 can use the past statistics, interpret the data, and compare the information. The Uplink Traffic Prediction/Estimation Module 404 can also work with the Throughput Estimation Module 416. The Throughput Estimation Module 416 can calculate the expected throughput (including both uplink and downlink throughput) for full-duplex 424 and half-duplex 428 and can compare them. The higher expected throughput will indicate whether full-duplex 424 or half-duplex 428 will be used.

The Radio Configuration Module 420 can work with the Throughput Estimation Module 416, take the estimation computed and switch to the appropriate radio mode. That is, the Radio Configuration Module 420 can switch modes between full duplex and half-duplex based on the throughput estimation results. For example, if the AP expects to have a higher throughput with full-duplex 432, then the AP will send out full-duplex discovery (FD-DISC) packet to find an uplink STA, otherwise, the AP will start data transmission using half-duplex 436. Further details regarding the full-duplex transmission process as well as the full-duplex discovery frames are described below and in conjunction with FIG. 5B.

Duplex communications includes communications between two devices (i.e., AP 108 and STA 104) that can transmit and receive information. The AP 108 can communicate with other wireless devices such as STA 104 using half-duplex communications or full-duplex communications. Half-duplex communications is the communication between the two devices (i.e., AP 108 and STA 108) in both directions, that is, the devices can both transmit and receive information, but only in one direction at a time. Full-duplex communications is a communication mechanism that recently introduced which, permits simultaneous communication between two parties at the same time and on the same frequency band.

Figure 5A:
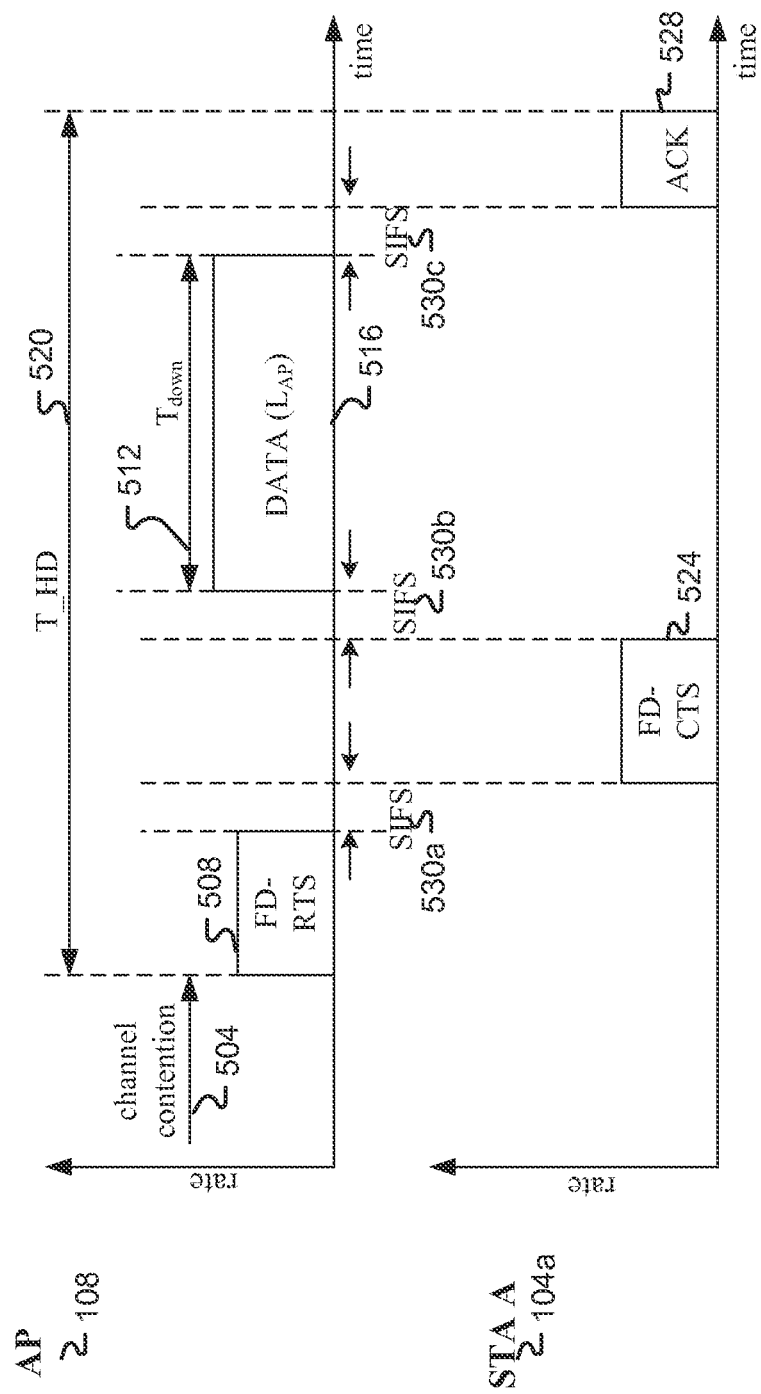
FIG. 5A illustrates an exemplary half-duplex transmission scheme.
Figure 5B:
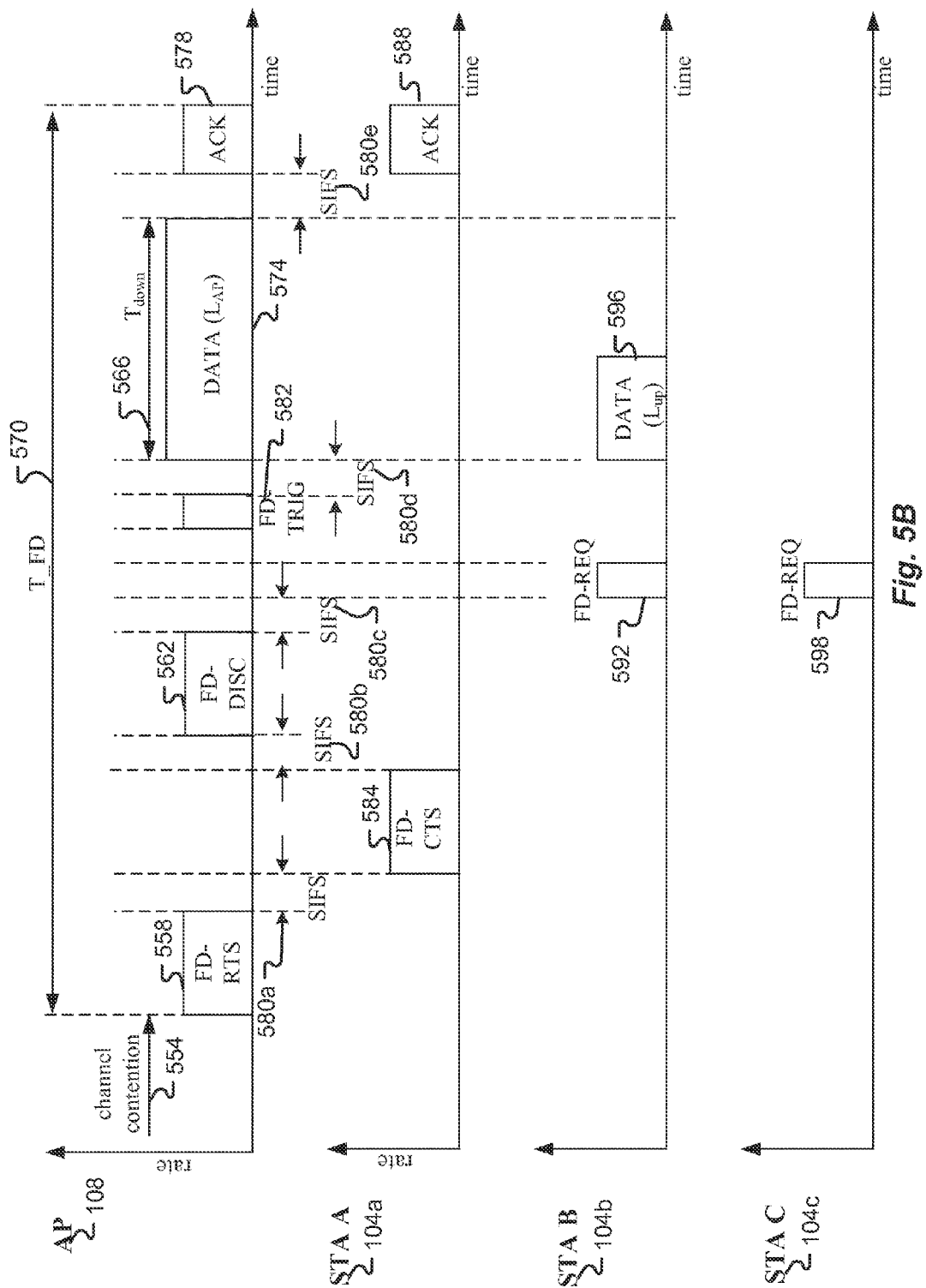
FIG. 5B illustrates an exemplary full-duplex transmission scheme.

FIG. 5A is an exemplary embodiment of a half-duplex transmission. Communication between the AP 108 and the STA 104 begins with a channel contention 504. Contention is a media access method in which a device, such as an AP 108 or STA 104, contends with other devices for a channel or radio frequency. Upon "winning" the channel, information transmission can occur. For example, if AP 108 obtains the channel, then the AP 108 can begin by transmitting a Full-Duplex Request to Send (FD-RTS) 508 message/frame to a STA A 104a requesting information from the station. The FD-RTS 508 frame can include control information including device address, duration of transmission and even a frame check sequence (FCS). Transmission of the FD-RTS can be sent for a downlink traffic communication. In response to the FD-RTS 508 frame transmission by the AP 108, STA A 104a can respond with a Full-Duplex Clear to Send (FD-CTS) 524 response/frame.

A FD-CTS 524 frame follows an FD-RTS 508 frame and can be the first frame in a frame exchange between the STA A 104a and the AP 108. The FD-CTS 524 frame is a frame that can also contain information regarding frame duration, address (which can be set to the MAC address of the transmitter) and a frame check sequence. Upon receipt of the FD-CTS 524 frame by the AP 108, the AP 108 can begin downlink data transmission 516 of length L and duration T_down 512. At the completion of the data frame transmission by the AP 108 to STA A 104a, STA A 104a responds with an acknowledgement (ACK) 528 of signal receipt. In general, between transmission of frames 508, 524, 516, 528, a short interval of time (i.e., Short Interframe Space (SIFS) 530) exists that the MAC and PHY use in order to assure the receipt of the last symbol of a frame and provides time for a device to respond to the frame received. Note that the SIFS 530 time interval can be optional, and can instead be, but is not limited to, a Distributed Coordination Function (DCF) Interframe Space (DIFS), a Point Coordination Function (PCF) Interframe Space (PIFS), an Extended Interframe Space (EIFS), etc., or can take on any other time duration. The duration of the half-duplex communication between AP 108 and the STA A 104a including frames and interfame spaces can be designated T_HD 520 and can vary based on the data 516, the channel conditions, and/or other contributing factors.

FIG. 5B is an exemplary embodiment of a full-duplex transmission scheme. In this scenario, a device (i.e., AP 108, STA 104) capable of full-duplex communication, can opportunistically select whether to transmit in full-duplex, or whether the system would benefit from simply transmitting at half-duplex. By using this type of opportunistic approach, the time spent on full-duplex opportunity detection and link setup is reduced. Opportunistic full-duplex transmission is a mechanism by which for example, the AP 108 determines which of the two transmission schemes provides higher throughput. The AP 108 can calculate/compare expected throughput performance of full-duplex vs. half-duplex communications for a given network environment, and initiate the full-duplex opportunity detection/identification processes only when it is expected to provide additional performance benefit over half-duplex based on previous uplink traffic history, etc. By doing this, the AP can avoid unnecessary overhead induced by full-duplex opportunity discovery and link setup when half duplex is expected to perform better, while enjoying the performance benefit of full-duplex when appropriate.

The communication between the AP 108 and one or more of the STAs 104a-104c can begin much like FIG. 5A above. For example, the transmission can begin with the AP 108 contending for a channel (i.e., channel contention 554). Next, once the AP 108 has "won" the channel, the AP 108 sends the FD-RTS 558 frame to a STA A 104a. The FD-RTS 558 establishes downlink communication. As indicated above and in conjunction with FIG. 5A, FD-RTS 558 is a frame containing various control information fields such as, but not limited to, duration, address, FCS, etc. In response, the AP 108 receives a FD-CTS 584 frame from the connecting STA A 104a. The FD-CTS 584 frame contains pertinent information for the communication with the AP 108 including duration, address, and even information as to whether STA A 104a has data to send to the AP 108. If the STA A 104a has data, then it is possible that the AP 108 can establish a full-duplex transmission with STA A 104a. Alternatively, the data to be sent by STA A 104a can be transmitted using half-duplex transmission. Simultaneously, the AP 108 can determine which of the two transmission schemes provides a greater throughput. In some instances, the throughput computation can occur prior to receipt of the FD-CTS 584 frame. Still in other instances, the throughput computation can occur after receipt of the FD-CTS 584 frame.

Using at least the Controller/Microprocessor 336 and/or the Duplex Determination Module 316, the AP 108 can calculate and compare the expected throughput when using half-duplex (i.e., $E[\text{Throughput}_{HD}]$) in Eq. (1) and full-duplex (i.e., $E[\text{Throughput}_{FD}]$) in Eq. (2).

$$E[\text{Throughput}_{HD}] = \frac{L_{AP}}{T_{FD\_RTS} + T_{FD\_CTS} + E[T_{T_{down}}] + T_{ACK} + 3*T_{SIFS}} \quad \text{Eq. (1)}$$

Equation (1) represents the expected throughput based on the length of the downlink message and the time durations of the various frames and short time intervals (i.e., FD-RTS 508, FD-CTS 524, ACK 528, SIFS 530 and Data 516 transmission duration). For example, $L_{AP}$ represents the message length of the downlink transmission (i.e., from the AP 108 to the STA A 104a). Similarly, $T_{FD\_RTS}$, $T_{FD\_CTS}$, and $T_{ACK}$ represent the transmission frame time durations for FD_RTS 508, FD_CTS 524, and ACK 528, respectively. The SIFS (Short Inter-Frame Space) time duration is represented as $T_{SIFS}$ and can be multiplied by three to account for a short time interval after each frame 508, 524, and 516. However, the SIFS time intervals are optional and/or can be varying intervals including, but not limited to, EIFS, DIFS, SIFS, PIFS, etc. Finally, the duration of the downlink data message (i.e., data 516) is computed as an expectation and therefore represented as $E[T_{T_{down}}]$.

Equation (2) is an equation that can be used to determine the expected throughput using full-duplex communications. Since full-duplex communications also contains some of the same frame exchanges and time intervals as half duplex, the expected throughput for full duplex transmission can be determined using a very similar Eq. (2).

$$E[\text{Throughput}_{FD}] = \frac{L_{AP} + E[L_{up}]}{\begin{array}{c} T_{FD\_RTS} + T_{FD\_CTS} + T_{FD-DISC} + T_{FD\_REQ} + T_{FD\_TRIG} + \\ \max(E[T_{TX_{down}}], E[T_{TX_{up}}]) + T_{ACK} + 6*T_{SIFS} \end{array}} \quad \text{Eq. (2)}$$

Equation (2) beings by accounting for the length of the downlink transmission (e.g., AP 108 to STA A 104a) with $L_{AP}$. In addition, because communication occurs in both uplink and downlink duration, the expected message length for uplink transmission should also be accounted for and is represented with $E[L_{up}]$. Note that in one example, the expectation of the message length for uplink transmission is computed because uplink transmission has not yet occurred. To determine the $E[L_{up}]$, previous uplink packet sizes or uplink resource allocation requested by the STAs 104a-104d can be used. The Uplink Traffic Prediction/Estimation Module 404 and/or uplink traffic profile 412 can at least be used to aid in determining these statistics. Further details regarding the resource allocation, traffic statistics and data collection is described above and in conjunction with FIG. 4.

Equation (2) also accounts for the transmission duration for the various packets much like Equation (1). For example, $T_{FD\_RTS}$, $T_{FD\_CTS}$, and $T_{ACK}$ represent the transmission frame time durations for FD_RTS 558, FD_CTS 584, and ACK 578, 588, respectively. Similarly, $T_{FD\_REQ}$, $T_{FD\_TRIG}$, and $T_{FD\_DISC}$ are the transmission time durations for FD_REQ 532, 598, FD_TRIG 582, and TD-DISC 562 packets, respectively. Additionally, the expected time duration for the uplink message transmission is represented by $E[T_{TXup}]$. Throughput computation and comparison can occur in the Duplex Determination Module 316 as described above and in conjunction with FIGS. 3 and 4.

Note that in some instances where full-duplex communication is used, discovery time used to identify a STA 104a-104d for uplink transmission may be considered additional overhead. Equation (2) represents this time by (i.e., $T_{FD\_DISC}+T_{FD\_REQ}+T_{FD\_TRIG}+3*\ T_{SIFS}$), which can become relatively significant when the actual data transmission time decreases (for short messages). Therefore, there can exist instances where full-duplex is discouraged and half-duplex becomes a better transmission scheme to use. Alternatively, when the expected uplink message length is similar to that of the downlink message (hence the nominator increases without increase in denominator), the expected throughput (i.e., $E[Throughput_{FD}]$) will increase and thus full-duplex is a better alternative.

Therefore, in one instance, where a system can gain throughput by using opportunistic transmission, the expected throughputs of a system using half-duplex and full-duplex are computed and compared. For example, if the $E[Throughput_{HD}]>E[Throughput_{FD}]$, the AP 108 selects the half-duplex mode. Alternatively, if $E[Throughput_{FD}]>E[Throughput_{HD}]$, AP 108 selects full-duplex mode and broadcasts a Full Duplex Discovery (FD-DISC) 562 packet/frame to STAs 104a-104c. Transmission of the FD-DISC 562 frame enables the AP 108 the opportunity to locate STAs 104a-104c with uplink traffic. The FD-DISC 562 frame contains sub-channel resource allocation information for the stations (i.e., STA 104a-104c) associated with the AP 108. The sub-channel resource allocation information indicates which sub-channel a STA needs to use for an uplink transmission when multiple STAs are transmitting simultaneously using an OFDMA scheme. That is to say, the AP 108 provides an appropriate sub-channel for the specific station to respond on. The sub-channel allocation information can be similar to the Trigger frame defined in the IEEE 802.11ax standard which contains sub-channel allocation information for the OFDMA operation.

In response to the transmitted FD-DISC 562 frame, the STAs 104a-10c with uplink data to transmit send a Full-Duplex Request (FD-REQ) 592,598 frame to the AP 108. Transmission of the FD-REQ 592, 598 by the STAs 104a-104c with information can occur simultaneously based on the sub-channel resource allocation information contained in the FD-DISC 562 frame. For example, if both STA B 104b and STA C 104c had uplink information to transmit to the AP 108, then both STA B 104b and STA C 104c simultaneously transmit the FD-REQ 592, 598 using the individual sub-channel indicated by the AP 108. The FD-REQ 592, 598 frames can contain varying control information for the AP 108 including a field that indicates the uplink data size.

The AP 108 receives both FD-REQ 592 and FD-REQ 598 and selects a STA (i.e., STA B 104b) for uplink traffic transmission. The AP 108 can select the appropriate STA (i.e., 104b) for uplink transmission based on the information, including data size, provided in the FD-REQ 592,598 and the expected throughput numbers obtained at the discovery stage. That is to say, the AP 108 can use the value computed from Equation (2) and the information from FD-REQ 592, 598 received to identify the STA 104 to communicate with. Once the STA B 104b has been identified, the AP 108 can broadcast a Full-Duplex Trigger (FD-TRIG) 582 to the network. Shortly thereafter, the AP 108 and the selected STA B 104b start data transmissions simultaneously. The time interval between transmission of the FD-TRIG 582 and the Data 596 can vary in time, may be optional, and can include any one or more of SIFS, DIFS, PIFS, EIFS, etc., time intervals. Note that such time intervals, PIFS 580, can exist before and/or after frames 558, 584, 562, 592, 598, 596, 582, 574, 578, and 588. Upon the completion of the Data 566,596 transmission, the AP 108 and STA B 104b send acknowledgement ACK 578,588 packets/frames. The ACK 578, 588 indicates reception of the Data 574,596. The time duration of the entire duplex communication is indicated by T_FD 570.

Figure 6:
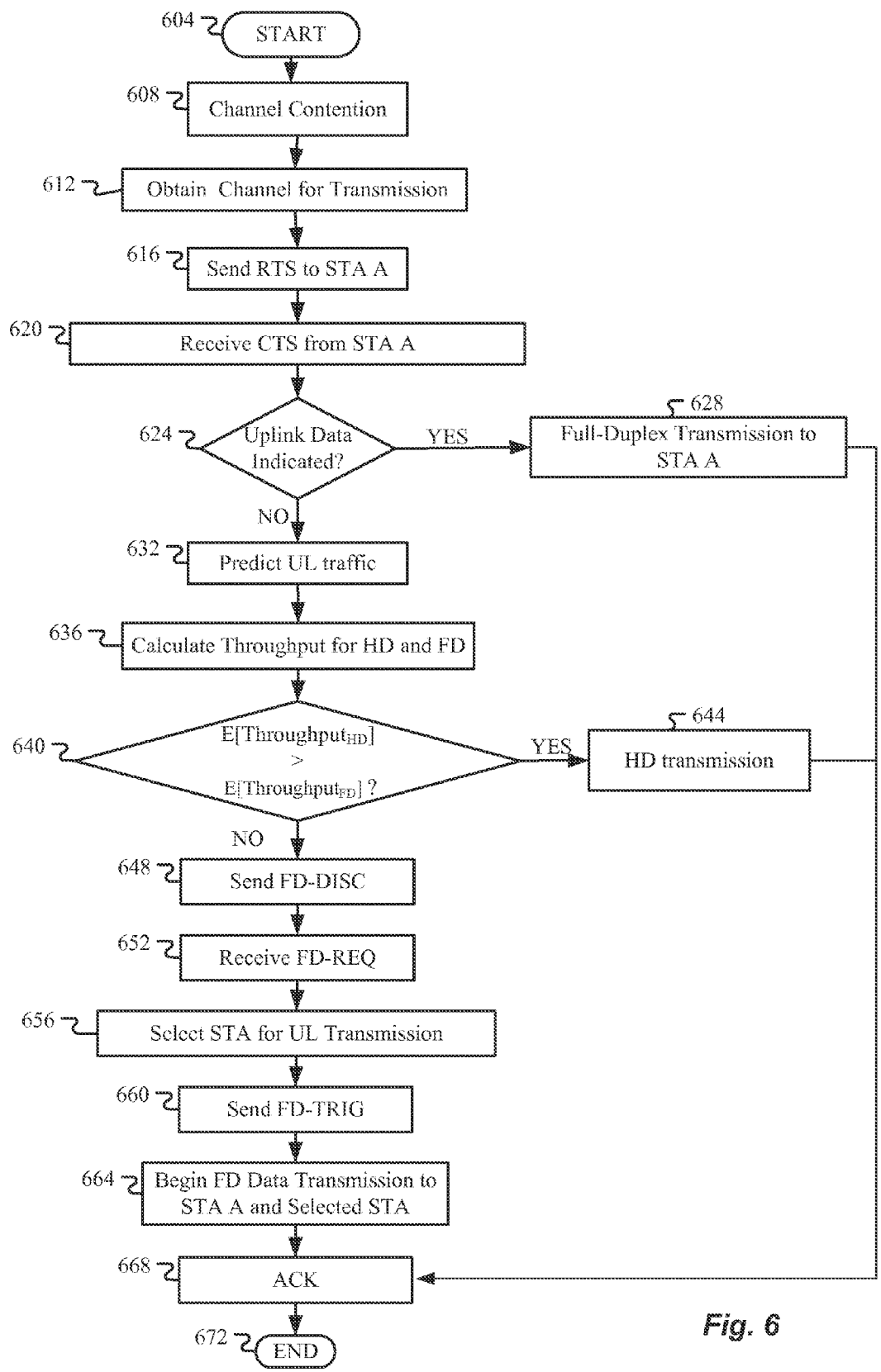
FIG. 6 is a flowchart illustrating opportunistic full-duplex transmission.

FIG. 6 outlines an exemplary flowchart illustrating opportunistic full-duplex transmission. In particular, association between two devices, such as a station and a wireless device/AP, begins at step 604 and continues to step 608. In step 608, the access point begins by contending for a medium in which to transmit and communicate with at least one station. The STA can be any one of a laptop computer, smartphone, wireless device, notebook, subnotebook, a tablet or other electronic computing device or communications device or videogame device, or entertainment device, or the like. Upon winning or obtaining the channel/frequency band on which to transmit, in step 612, the AP sends a Request to Send (FD-RTS) frame to neighboring STAs for downlink transmission, in step 616.

A station with capacity to receive information broadcasts a Clear to Send (FD-CTS) frame indicating its (i.e., the station's) availability. The FD-CTS frame establishes, what becomes the first frame in a frame exchange between the STA and the AP. The FD-CTS frame, as indicated above can contain information regarding frame duration, address (which can be set to the MAC address of the transmitter), frame check sequence and even details on whether the STA contains uplink data. Upon receipt of the FD-CTS frame by the AP, the AP determines, in step 624, using the CTS information received, whether the STA requires full-duplex transmission. If indeed the STA indicates it can communicate and carries uplink data, then the AP proceeds to step 628 to transmit and receive data in both uplink and downlink direction simultaneously. At step 628, the AP performs a full-duplex transmission with the station. The data transmission continues to completion and is followed by transmission and reception of acknowledgements from both the AP and station in step 668.

Alternatively, if the station does not indicate in its CTS frame that it has uplink data, then the process continues to step 632. At step 632 and in conjunction with at least the Duplex Determination Module, the AP begins predicting uplink traffic, resource allocation data and repository of data, in step 632, to calculate the expected half duplex and full duplex throughput in step 636. Computation of the transmission throughput includes the length of the uplink/downlink transmission, frame intervals and expected time duration for the uplink and/or downlink message transmission as indicated in Eq. (1) and Eq. (2) above. Once the throughput values have been computed, the process continues to step 640 for throughput comparison. If the $E[Throughput_{HD}]>E[Throughput_{FD}]$, then the AP determines that half-duplex transmission provides for better system performance and should be used. Half-duplex occurs in step 644, where transmission of the entire data occurs and continues to step 668 where the AP receives ACK of frame receipt.

If however, the AP determines that $E[Throughput_{HD}]>E[Throughput_{FD}]$, is not true, then full-duplex transmission is estimated/predicted to outperform half-duplex. When system performance is greater using full-duplex transmission, FD should be used as the transmission scheme of choice. Once the AP has determined to use FD transmission, the AP broadcasts a discovery frame FD-DISC which allows the AP to identify stations with uplink traffic. The FD-DISC frame is sent in step 648, and contains information regarding sub-channel allocation for neighboring stations to use in the response. The stations which contain uplink traffic respond to the discovery frame by transmitting a request frame (i.e., FD-REQ). The FD-REQ frames from the various neighboring stations are received by the AP in step 652. The FD-REQ frames contain among other things, a field indicating the data size. The AP in response to the received REQ frames, uses the data size and the throughput information determined in step 640 to select the station for uplink transmission, in step 656. To notify the neighboring stations of the selected station, the AP broadcasts, in step 660, a trigger fame, FD-TRIG identifying the selected station. Soon thereafter, the AP and the selected station begin data transmission simultaneously, in step 664. Upon completion of the data transmission, the AP and the selected station transmit receipt acknowledgement frames, ACK, in step 668. Once the ACK frame(s) are received, the process ends in step 672. Further details describing opportunistic full duplex transmission are explained in greater detail above and in conjunction with FIGS. 1-5.

The exemplary embodiments are described in relation to mechanisms that enable dynamically switching between transmission schemes to increase the system throughput in a wireless communication between two or more devices. However, it should be appreciated, that in general, the systems and methods herein will work equally well for any type of communication system in any environment utilizing any one or more protocols including wired communications, wireless communications, powerline communications, coaxial cable communications, fiber optic communications and the like.

The exemplary systems and methods are described in relation to IEEE 802.11 transceivers and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the present embodiments. It should be appreciated however, that the techniques herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as an access point or station, or collocated on a particular node/element(s) of a distributed network, such as a telecommunications network. As will be appreciated from the following description, and for reasons of computational efficiency, the components of the system can be arranged at any location within a distributed network without affecting the operation of the system. For example, the various components can be located in a transceiver, an access point, a station, a management device, or some combination thereof. Similarly, one or more functional portions of the system could be distributed between a transceiver, such as an access point(s) or station(s) and an associated computing device.

Furthermore, it should be appreciated that the various links, including communications channel(s), connecting the elements (which may not be not shown) can be wired or wireless links, or any combination thereof, or any other known or later developed element(s) that is capable of supplying and/or communicating data and/or signals to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

While the above-described flowcharts have been discussed in relation to a particular sequence of events, it should be appreciated that changes to this sequence can occur without materially effecting the operation of the embodiment(s). Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on a wireless telecommunications device(s)/system, such an IEEE 802.11 transceiver, or the like. Examples of wireless protocols that can be used with this technology include IEEE 802.11a, IEEE 802.11b, IEEE 802.11g, IEEE 802.11n, IEEE 802.11ac, IEEE 802.11ad, IEEE 802.11af, IEEE 802.11ah, IEEE 802.11ai, IEEE 802.11aj, IEEE 802.11aq, IEEE 802.11ax, IEEE 802.11u, WiFi, LTE, LTE Unlicensed, 4G, Bluetooth®, WirelessHD, WiGig, 3GPP, Wireless LAN, WiMAX.

The term transceiver as used herein can refer to any device that comprises hardware, software, firmware, or combination thereof and is capable of performing any of the methods described herein.

Additionally, the systems, methods and protocols can be implemented to improve on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to the disclosure provided herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments®

Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with the embodiments is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA.RTM. or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

It is therefore apparent that systems and methods for an opportunistic full-duplex transmission for communication between two or more stations have been presented. While the embodiments have been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A wireless device, comprising:
   a transceiver, the transceiver configured to:
      transmit a plurality of data frames;
   a processor, the processor configured to:
      establish a half-duplex downlink connection with at least a first station;
      compute expected system throughput to de.terminc:' whether half-duplex or fuil-duplex provides greater expected throughput based on: an expected message length for an uplink transmission, transmission frame time durations for a full- duplex request to send and a full-duplex clear to send, and transmission time durations for a full- duplex request, a full-duplex trigger and a full-duplex discovery;
      when full-duplex provides greater expected throughput and the first station does not have uplink data to transmit, the transceiver further configured to:
      transmit at least a discovery frame, wherein the discovery frame identifies at east a second station having uplink data;
      receive a request frame for the uplink data from the at least second station, wherein the request frame contains data length information that is used to select the second station for uplink transmission; and
      receive the uplink data in a full-duplex mode from the at least second station.

2. The wireless device of claim 1, wherein in establishing the downlink connection with the at least first station includes transmission of at least a request to send and clear to send frame.

3. The wireless device of claim 1, wherein when the at least first station contains uplink data, a full duplex transmission is established.

4. The wireless device of claim 1, wherein in computing the system throughput for the at least one transmission scheme, the wireless device determines an expected throughput of a half duplex transmission scheme and the expected throughput of a full duplex transmission scheme.

5. The wireless device of claim 4, wherein in computing the system throughput further includes monitoring uplink traffic used for determining the expected uplink traffic.

6. The wireless device of claim 4, wherein the expected throughput of the at least one transmission scheme with a higher system performance is selected.

7. The wireless device of claim 6, wherein if the half duplex transmission scheme has the higher system performance, the half duplex transmission scheme is selected.

8. The wireless device of claim 6, wherein if the full duplex transmission scheme has the higher system performance, the full duplex transmission scheme is selected.

9. The wireless device of claim 1, wherein the discovery frame transmitted includes a sub-channel allocation for the at least second station.

10. The wireless device of claim 1, wherein a trigger frame is broadcasted by the wireless device identifying the second station for uplink transmission.

11. The wireless device of claim 1, wherein at a conclusion of the uplink data transmission and the downlink data transmission an acknowledgement frame is transmitted.

12. A method comprising:
   transmitting, by a transceiver, a plurality of data frames;
   establishing, by a processor, a half-duplex downlink connection with at least a first station;
   computing, by the processor, expected system throughput to determine whether half-duplex or full-duplex provides greater expected throughput based on: an expected message length for an uplink transmission, transmission frame time durations for a full-duplex request to send and a full-duplex clear to send, and transmission time durations for a full-duplex request, a full-duplex trigger and a full-duplex discovery;
   when full-duplex provides greater expected throughput and the first station does not have uplink data to transmit, transmitting, by the transceiver, at least a discovery frame, wherein the discovery frame identifies at least a second station having uplink data;
   receiving, by the transceiver, a request frame for the uplink data from the at least second station, wherein the request frame contains data length information that is used to select the second station for uplink transmission; and receiving, by the transceiver, in a full-duplex mode the uplink data from the at least second station.

13. The method of claim 12, wherein in establishing the downlink connection with the at least first station includes transmission of at least a request to send and clear to send frame.

14. The method of claim 12, wherein when the at least first station contains uplink data, a full duplex transmission is established.

15. The method of claim 12, wherein in computing the system throughput for the at least one transmission scheme, the wireless device determines an expected throughput of a half duplex transmission scheme and the expected throughput of a full duplex transmission scheme.

16. The method of claim 15, wherein in computing the system throughput further includes monitoring uplink traffic used for determining the expected uplink traffic.

17. The method of claim 15, wherein the expected throughput of the at least one transmission scheme with a higher system performance is selected, and/or wherein if the half duplex transmission scheme has the higher system performance, the half duplex transmission scheme is selected, and/or wherein if the full duplex transmission scheme has the higher system performance, the full duplex transmission scheme is selected.

18. The method of claim 12, wherein the discovery frame transmitted includes a sub-channel allocation for the at least second station, and/or wherein a trigger frame is broadcasted by the wireless device identifying the second station for uplink transmission.

19. A non-transitory computer readable medium having instructions thereon that when executed by at least one processor of a wireless device perform a method comprising:
    transmitting, hy a transceiver, a plurality of data frames;
    establishing, by a processor, a half-duplex downlink connection with at least a first station;
    computing, by the processor, expected system throughput to determine whether half-duplex or full-duplex provides greater expected throughput based on: an expected message length for an uplink transmission, transmission frame time durations for a full-duplex request to send and a full-duplex clear to send, and transmission time durations for a full-duplex request, a full-duplex trigger and a full-duplex discovery;
    when full-duplex provides greater expected throughput and the first station does not have uplink data to transmit, transmitting, by the transceiver, at least a discovery frame, wherein the discovery frame identifies at least a second station having uplink data;
    receiving, by the transceiver, a request frame for the uplink data from the at least second station, wherein the request frame contains data length information that is used to select the second station for uplink transmission; and
    receiving by the transceiver, the uplink data in a full-duplex mode from the at least second station.

20. The non-transitory medium of claim 19, wherein in establishing the downlink connection with the at least first station includes transmission of at least a request to send and clear to send frame.

21. The non-transitory medium of claim 19, wherein when the at least first station contains uplink data, a full duplex transmission is established.

22. The non-transitory medium of claim 19, wherein in computing the system throughput for the at least one transmission scheme, the wireless device determines an expected throughput of a half duplex transmission scheme and the expected throughput of a full duplex transmission scheme.

23. The non-transitory medium of claim 22, wherein in computing the system throughput further includes monitoring uplink traffic for determining the expected uplink traffic.

24. The non-transitory medium of claim 22, wherein the expected throughput of the at least one transmission scheme with a higher system performance is selected, and/or wherein if the half duplex transmission scheme has the higher system performance, the half duplex transmission scheme is selected, and/or wherein if the full duplex transmission scheme has the higher system performance, the full duplex transmission scheme is selected.

25. The non-transitory medium of claim 19, wherein the discovery frame transmitted includes a sub-channel allocation for the at least second station, and/or wherein a trigger frame is broadcasted by the wireless device identifying the second station for uplink transmission.

\* \* \* \* \*

UNITED STATES PATENT AND TRADEMARK OFFICE
CERTIFICATE OF CORRECTION

PATENT NO. : 9,686,071 B2
APPLICATION NO. : 14/747096
DATED : June 20, 2017
INVENTOR(S) : Alexander W. Min et al.

It is certified that error appears in the above-identified patent and that said Letters Patent is hereby corrected as shown below:

In the Claims

- At Column 17, Claim 1, Line 60, delete "de.terminc:'" and insert -- determine --, therefore.

- At Column 17, Claim 1, Line 61, delete "fuil" and insert -- full --, therefore.

- At Column 18, Claim 1, Line 5, delete "east" and insert -- least --, therefore.

- At Column 19, Claim 19, Line 35, delete "hy" and insert -- by --, therefore.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*